(12) United States Patent
Kelly et al.

(10) Patent No.: US 7,225,915 B2
(45) Date of Patent: Jun. 5, 2007

(54) MOUNTABLE CLEANING APPARATUS FOR COMMERCIAL CONVEYORS

(76) Inventors: Carol Lynn Kelly, 1271 NW. 13[13] St., Apt. 358E, Boca Raton, FL (US) 33486; John S Lechaton, 1771 7th St., Englewood, FL (US) 34223

( * ) Notice: Subject to any disclaimer, the term of this patent is extended or adjusted under 35 U.S.C. 154(b) by 110 days.

(21) Appl. No.: 11/099,003

(22) Filed: Apr. 5, 2005

(65) Prior Publication Data
US 2006/0219524 A1    Oct. 5, 2006

(51) Int. Cl.
*B65G 45/22* (2006.01)
*B65G 45/24* (2006.01)

(52) U.S. Cl. ................................ 198/495; 198/494
(58) Field of Classification Search ............. 198/495
See application file for complete search history.

(56) References Cited

U.S. PATENT DOCUMENTS

| | | | | |
|---|---|---|---|---|
| 4,073,376 A | * | 2/1978 | Krooss | 198/498 |
| 4,960,200 A | * | 10/1990 | Pierce | 198/495 |
| 4,976,342 A | * | 12/1990 | Hwang | 198/495 |
| 5,355,992 A | * | 10/1994 | Baig et al. | 198/495 |
| 5,372,243 A | | 12/1994 | King | 198/495 |
| 5,542,525 A | * | 8/1996 | Kornely | 198/495 |
| 5,613,594 A | | 3/1997 | Kootsouradis | 198/495 |
| 5,746,302 A | | 5/1998 | Bowman | 198/496 |
| 6,945,383 B2 | * | 9/2005 | Pham | 198/495 |
| 6,971,503 B2 | * | 12/2005 | Thompson | 198/494 |

* cited by examiner

*Primary Examiner*—Mark A. Deuble
(74) *Attorney, Agent, or Firm*—Saile Ackerman LLC; Stephen B. Ackerman

(57) ABSTRACT

A first embodiment of this invention is a cleaning apparatus for a commercial conveyor belt that is mounted on a conveyor table. The cleaning apparatus is a housing that includes a spraying tube for dispensing a cleaning solution and a novel wiping device. The wiping device is constructed to apply a disposable towel, such as a paper towel, to the conveyor belt to remove the solvent including any contaminants while the conveyor belt is in motion. The used disposable towels are deposited into a waste container thereby requiring very little cleaning maintenance. By a second embodiment the spraying tube is eliminated and the disposable paper towels include a solvent (wet wipes) for removing the contaminants. The cleaning apparatus is preferably mounted on the underside of the conveyor belt next to a crumb tray so that the cashier can easily operate the cleaning apparatus.

20 Claims, 3 Drawing Sheets

MOUNTABLE CLEANING APPARATUS FOR COMMERCIAL CONVEYORS

BACKGROUND OF THE INVENTION (1) Field of the Invention

This invention provides an apparatus and method for cleaning conveyor tables used in commercial applications. The cleaning apparatus is intended for cleaning and sanitizing conveyor belts used in supermarkets and other retail outlets. The apparatus reduces cross-contamination of food products, and has minimal maintenance requirements. This novel cleaning apparatus is mountable on existing conveyor tables currently used in supermarkets, and includes a self-cleaning feature of the conveyor belt using disposable towels that reduces downtime and improves worker productivity. The cleaning apparatus can be intermittently started and stopped and can also be operated during check-out to avoid customer inconvenience.

(2) Description of the Prior Art

Conveyor tables are used extensively at check-out counters in supermarkets and other retail store outlets. A variety of products such as food products are usually placed on a conveyor. During customer check-out leakage and spillage can cross-contaminate other products, particularly food products. Large retail outlets also sell goods such as insecticides, automotive oil products, garden products and the like that can further contaminate other products and possibly endanger public health. Generally it is the responsibility of the check-out clerk to ensure that the conveyor table is manually cleaned periodically. This requires applying a detergent and/or antibacterial solution and removing the contaminated materials, such as by hand cleaning using a paper towel. These frequent cleanings result in lost productivity and more importantly may not result in thorough cleaning and sanitizing of the conveyor belt. During rush hours when customer traffic is high, it is difficult to consistently maintain a clean conveyor belt.

Several methods for cleaning a conveyor belt have been reported in the literature. For example, in U.S. Pat. No. 5,372,243 to King a pneumatically controlled system is used to replace an electrically controlled cleaning system. The system is designed to apply a cleaning solution with a rinse cycle through a series of nozzles positioned between the belts and have a multiple of zones. The process can be repeated using timers. The invention is intended to reduce the amount of labor to service the equipment and the amount of cleaning compound needed to clean the conveyor belt for the food and packaging industry. Another apparatus and method for cleaning conveyor belts is described in U.S. Pat. No. 5,613,594 to Kootsouradis in which a number of embodiments are described for a cleaning apparatus. A plurality of belt treatment apparatus having spray nozzles are used to apply a treatment fluid to the belt as the belt passes through the cleaning chambers while entrance and exit diverts are used to contain the cleaning fluids. The apparatus and method do not address the cleaning procedure for cleaning the chambers. In still another patent, U.S. Pat. No. 5,746,302, conveyor cleaning assemblies are described in which cleaning brushes and scrapers are used to remove debris such as occurs in food manufacturing. The brushes are designed for easy cleaning which appears to be an independent cleaning step.

The above apparatus and methods appear to require a separate cleaning procedure which will result in extra maintenance cost and reduced productivity. Further, the cost and complexity of installing the cleaning apparatus appears to be significant. Therefore there is still a strong need in the consumer service industry for a self-cleaning conveyor apparatus with easily replaced cleaning parts and which requires minimal downtime. The cleaning apparatus should also be mountable on existing conveyor tables with minimal time and cost.

SUMMARY OF THE INVENTION

A principal object of the present invention is to provide a conveyor cleaning apparatus and method for cleaning commercial conveyor tables.

A second object of this invention is to provide a conveyor cleaning apparatus that is self-cleaning using a wiping device and a disposable towel for reduced maintenance and increased productivity.

A third object of this invention is to provide a conveyor cleaning apparatus which is easy to remove and attachable (mountable) to the conveyor table for easy servicing of both the conveyor table and cleaning apparatus with minimal downtime.

A fourth object of this invention by a second embodiment is to provide a wiping device which uses a wet wipe that is easy to remove.

In accordance with the present invention a conveyor cleaning apparatus and method are described for use on a commercial conveyor table such as those used in most large grocery stores, supermarkets, and retail outlets. The apparatus is comprised of a metal or plastic housing that extends across and under or over a (minor) portion of the conveyor belt and is normal (at a right angle) to the conveyor belt's direction of motion (V) to provide a cleaning chamber. At least one spraying tube extends through an opening in a first side of the housing and extends over the conveyor belt to a second side of the housing. The spraying tube is in proximity to the conveyor belt with an array of orifices across the tube that extends in the direction of the conveyor belt to direct a cleaning solution (S) onto the conveyor belt. A wiping device is also included within the housing. A novel feature of the invention is that the wiping device has at least one disposable towel and extends across and normal to the conveyor belt's direction (V) for removal of the cleaning solution (S) and any included contaminants by the disposable towel. During operation of the conveyor belt cleaning apparatus, a cleaning and disinfectant solution is sprayed onto the conveyor belt and a disposable towel is then applied to the belt to remove the cleaning solution and any contaminants using the wiping device. When the cleaning apparatus is mounted under and in contact with the conveyor belt, after one complete cycle of the conveyor belt the used disposable towel is released (by gravity) into a container. If the cleaning apparatus is mounted on the top surface of the conveyor belt, then the used disposable towel is released and allowed to continue down the conveyor belt to be disposed of by the check-out clerk (cashier). Alternatively a capturing device can be included in the housing to capture and dispose of the soiled towel.

By a second embodiment, a disposable wet-wipe towel device can be incorporated in the wiping device to clean and disinfect the conveyor belt thereby eliminating the need for the spraying mechanism and simplifying the cleaning process and manufacturing cost. In this second method the wet-wipe disposable towel can be replaced after a predetermined number of cleaning cycles of the conveyor belt.

DESCRIPTION OF THE PREFERRED EMBODIMENTS

In accordance with the present invention a novel cleaning apparatus on a conveyor belt and method are described for use on a commercial conveyor table used in most supermarkets.

Figure 1:
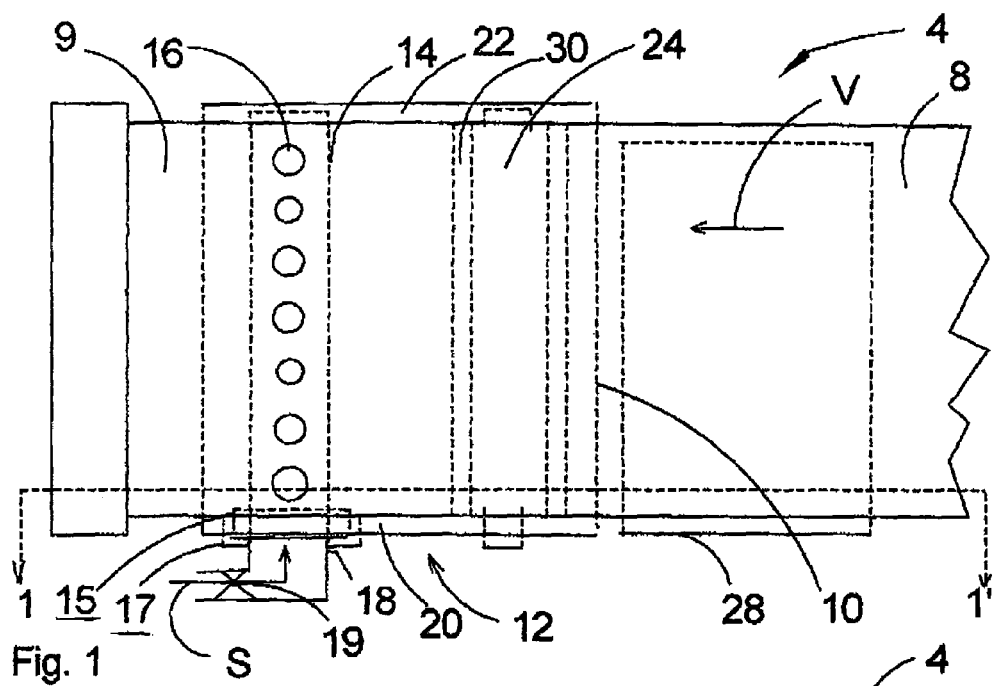
FIG. 1 shows a schematic top view of a portion of a conveyor belt with this novel cleaning apparatus that uses a spraying tube and a wiping device with a disposable towel mounted on the bottom side of the conveyor belt by a first embodiment.

Referring to FIG. 1, a top view is shown of a portion of a conveyor table 4 having a continuous conveyor belt 8 in which the novel conveyor cleaning apparatus 12 is depicted. The cleaning apparatus 12 is mounted under the conveyor belt 8 at the end of the belt 8 and near the check-out counter (optical scanner) (not shown) so that a check-out clerk can conveniently operate the cleaning apparatus 12 manually while serving the customer. However, it should be understood that the cleaning apparatus 12 can be mounted anywhere on the conveyor table 4, and remotely controlled using an electrical and/or hydraulic servo system to operate the cleaning apparatus 12.

Figure 2:
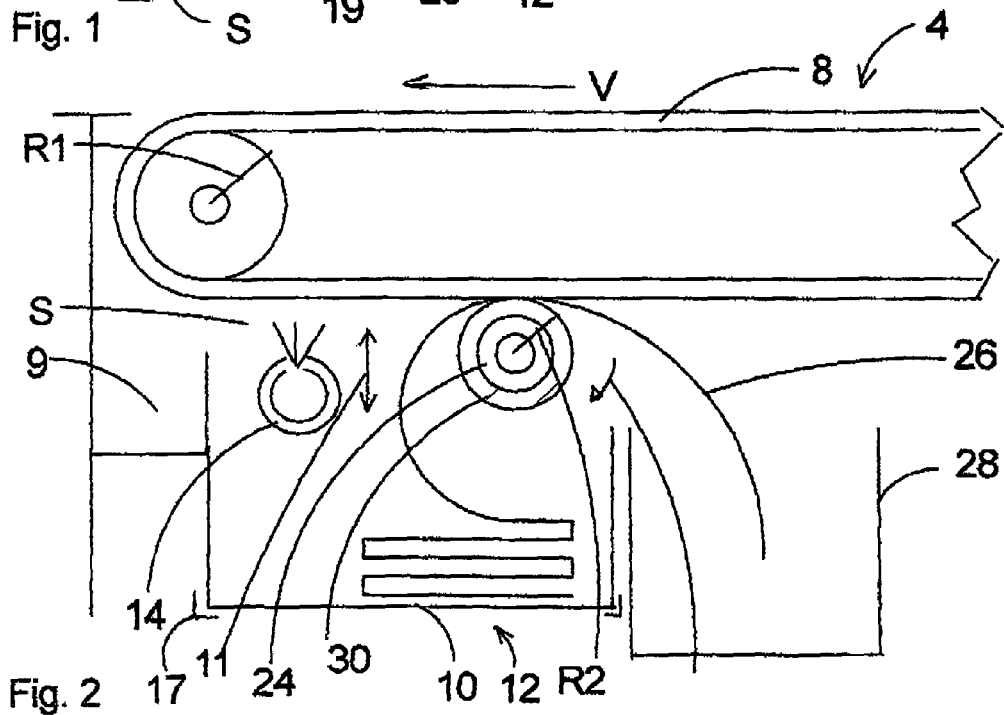
FIG. 2 shows a schematic cross-sectional view of a portion of a conveyor belt showing the cleaning apparatus in FIG. 1, and depicting the essential operating parts.

The cleaning apparatus 12 is encased in a housing 10, made, for example, of metal, plastic, and the like, that extends under and across a (minor) portion of the conveyor belt 8 and is normal (at a right angle) to the direction of motion of the conveyor belt 8, as depicted by the arrow V in both FIGS. 1 and 2. The housing 10 is preferably mounted by providing a bracket 17 (shown in FIG. 2) in the conveyor table 4 next to the crumb tray 9 in which the housing can be easily inserted and secured. However, it should be understood by those skilled in the art that the housing can be directly mounted to the conveyor table 4, for example by modifying the conveyor table 4 and using bolts, as shown in FIG. 2. The details of mounting the housing are not shown to simplify the drawings and because the mounting is by conventional means.

Still referring to FIG. 1, at least one spray tube 14 extends through an opening 18 in a first side 20 of the housing 10 and extending across and under the conveyor belt 8 to a second side 22 of the housing 10. A cleaning solution S is injected into the spray tube 14 from a manually pressurized solution container (not shown) and a shut-off valve 19 between the container and the spray tube 14. The valve 19 can also be automated using servo-mechanism. The wiping device 24 is also mounted in the housing 10 adjacent to the spray tube 14. The wiping device 24 also includes a separate flexible sleeve 30 to improve the wiping effectiveness and for servicing, but the sleeve 30 can also be an integral part of the wiping device 24.

Referring to FIG. 2, a schematic cross-sectional side view is shown for the cross section through 1–1' of FIG. 1 to better appreciate and to describe in more detail the cleaning apparatus 12. The spraying tube 14 is in proximity to the conveyor belt 8, and the spraying tube 14 includes an array of orifices (openings) 16 across the spraying tube that extend upward to direct a cleaning solution S onto the conveyor belt 8.

Still referring to FIG. 2, a novel feature of the invention is to provide a wiping device 24 in the housing 10 having one or more disposable towels 26 positioned between the wiping device 24 and the conveyor belt 8. The wiping device 24 extends across and normal to the direction of motion V of the conveyor belt 8. The wiping device 24 is supported by and between the front portion 20 and the back portion 22 of the housing 10 (see FIG. 1), but is free to move up and down, as depicted by the arrow 11, to engage the conveyor belt 8 and also to rotate with an angular speed $\omega$ to provide a wiping action with the disposable towel 26. Although the towels 26 are depicted as a stack, it should be understood that they can be dispensed by some other means, such as from a roll. During operation of the conveyor belt cleaning apparatus 12, a cleaning and disinfectant solution S is sprayed onto the conveyor belt and concurrently a disposable towel 26 is applied to the belt to remove the cleaning solution and any contaminants. The wiping device 24 is preferably a cylinder composed of a material such as aluminum, hard plastic, and the like, and the outer flexible sleeve 30 is formed from a soft, non-absorbent, flexible spongy material. The wiping device 24 with the flexible sleeve 30 is designed to provide a static frictional force $F_{static}$ between the flexible sleeve and the disposable towel, where $F_{static}$ is greater than the sliding frictional force $F_{sliding}$ between the conveyor belt 8 and the disposable towel 26 when the conveyor belt is in motion. The wiping device (cylinder) 24 with sleeve 30 having a radius R2 is made to rotate through a linear distance that is less than the distance the conveyor belt 8 rotates R2 through. By way of example only, if the cylindrical wiping device 24 has a radius R2 of 1.0 inches and if the conveyor-belt roller radius R1 is 12.0 inches, then for every 12.0 inches the conveyor belt 8 advances, the disposable towel 26 advances by one inch. For example, if the total length of the conveyor belt 8 is 12 feet, then to clean the conveyor belt would require 12 inches of disposable towel 26. It should also be clear that by using reducing gears and the like, the ratio of R2 to R1 can be optimized to minimize the use of the disposable towel 26. The disposable towel is preferably paper.

Although the cleaning apparatus is preferably mounted as above, it should be understood that it can also be mounted elsewhere on the conveyor table 4, such as over or on the opposite side of the table 4 (not shown). In this configuration after one complete cleaning cycle of the conveyor belt, a disposable towel can be released to continue down the conveyor belt to be disposed of by the check-out clerk (cashier), or alternatively a capturing device can be included in the housing to remove and dispose of the soiled disposable towel.

Figure 3:
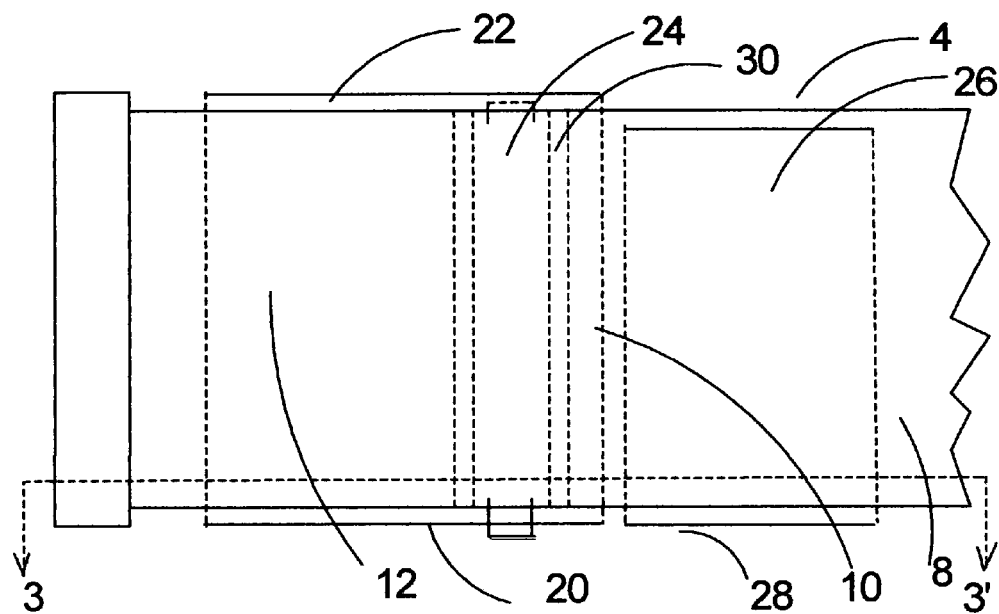
FIG. 3 shows a schematic top view of a conveyor belt with this novel cleaning apparatus using a wiping device having a wet wipe, which eliminates the need for a spraying tube and disposable towel, mounted on the bottom side of the conveyor belt by a second embodiment.
Figure 4:
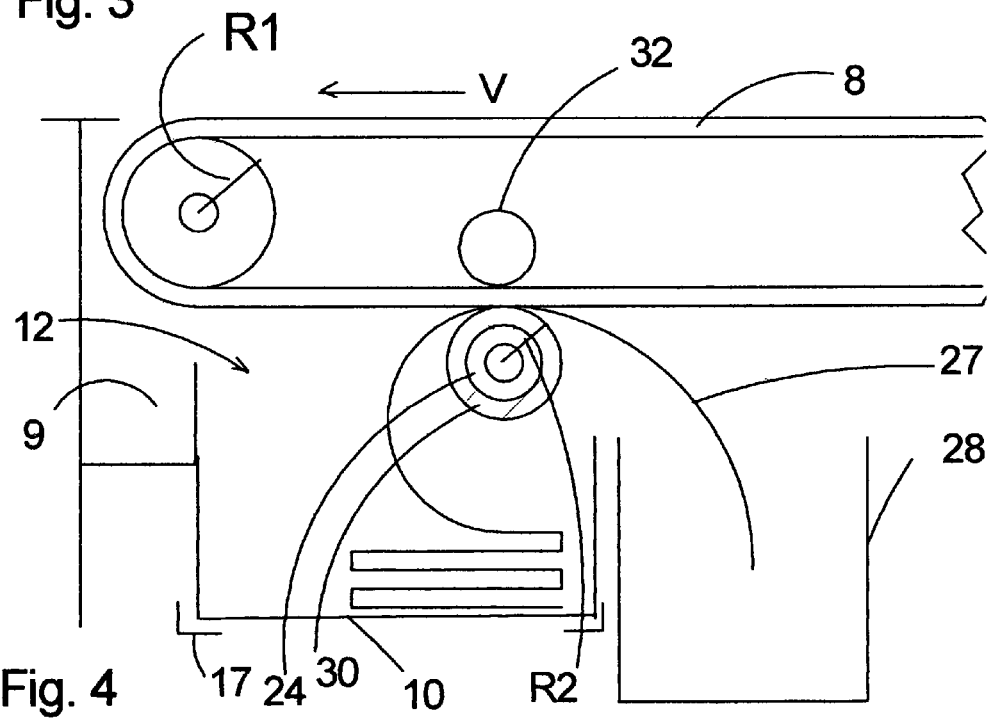
FIG. 4 shows a schematic cross-sectional view of a portion of the conveyor belt having the cleaning apparatus in FIG. 3, and depicting the essential operating parts.

Referring to FIG. 3 and FIG. 4, a top view and a cross-sectional schematic view, respectively, are shown for a second embodiment. In this cleaning apparatus the spray tube 14 (shown in FIGS. 1 and 2) is eliminated, and the wiping device 26 with sleeve 30 uses a disposable towel 27 that contains a cleaning solution (wet-wipe towel) that is used to clean and disinfect the conveyor belt 8. This configuration eliminates the need for the spraying mechanism and simplifies the cleaning process and reduces manufacturing cost. In this second method the wet-wipe disposable towel can be replaced after a predetermined number of cleaning cycles of the conveyor belt.

Figure 5:
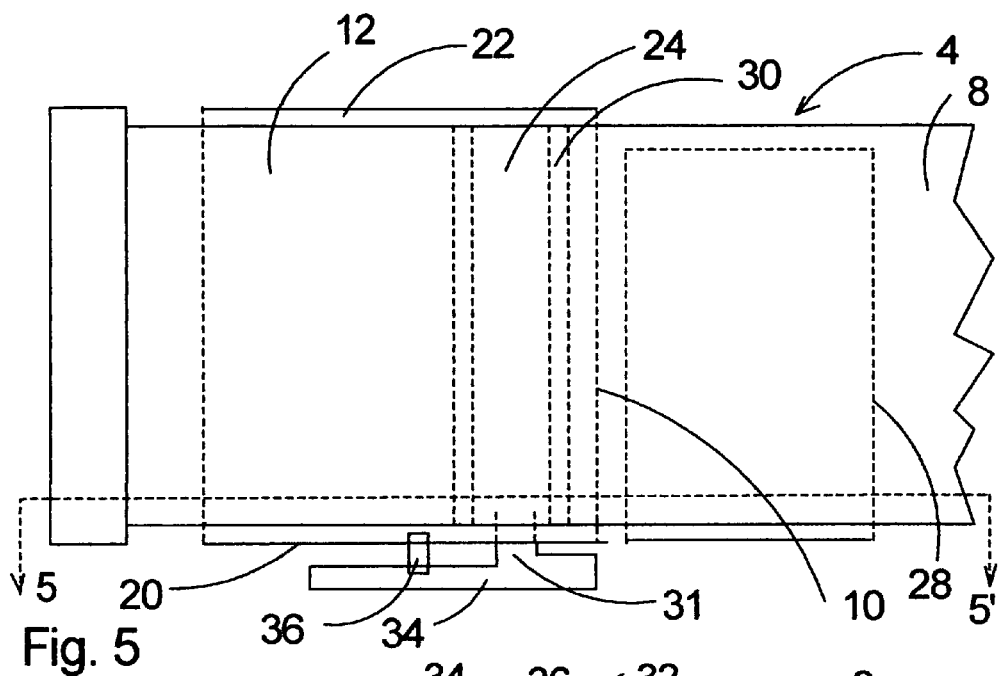
FIG. 5 shows a schematic top view of a conveyor belt with this novel cleaning apparatus mounted on the bottom side of the conveyor belt using a mechanical means for applying the wiping device to the conveyor belt for the second embodiment.
Figure 6:
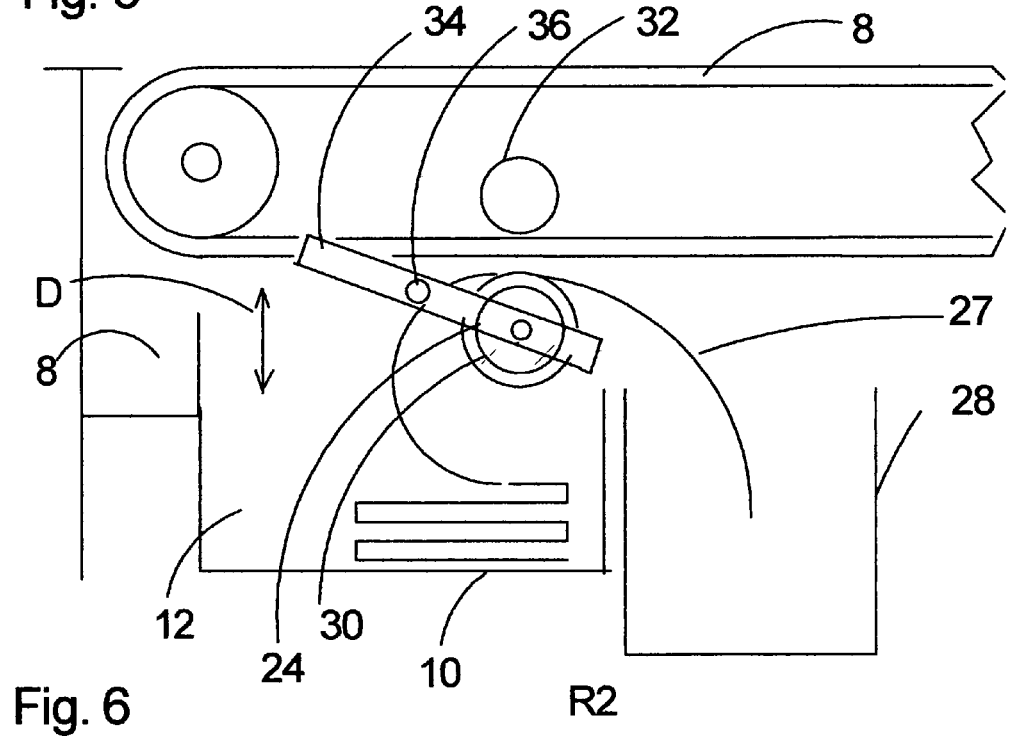
FIG. 6 shows a schematic cross-sectional view of a portion of the conveyor belt having the cleaning apparatus in FIG. 5, for applying a mechanical means to engage the wiping device with the conveyor belt.

Referring to FIGS. 5 and 6, a mechanical means and method are described for engaging the wiping device 26 for the cleaning apparatus 12 of the first and second embodiments. The mechanical means of engaging the cleaning apparatus can be achieved manually, as described below. A manual operation provides a cost-effective method for cleaning the conveyor belt 8, but it should be understood that the conveyor belt cleaning apparatus 12 can be modified using electrical and/or hydraulic systems, for example by using a microprocessor to fully automate this novel cleaning apparatus 12. This automation improves productivity by freeing up the check-out clerk, but is more costly to install. However, an automated cleaning apparatus is advantageous at self-check stations where check-out clerks are not required.

Referring to FIG. 5, a schematic top view of the conveyor table 4 is shown. The drawing is for the second embodiment which does not include the spray tube 14, therefore, it simplifies the drawing, but the mechanical means for engaging the wiping device 24 would be the same as in the first embodiment. As shown in FIG. 5, a lever 34 is attached to the wiping device 24 at a point 31, and the lever is rotated around a shaft 36 to engage the wiping device 24. The wiping device is engaged and disengaged by moving the lever 34 in an up and down position, as indicated by the double-headed arrow D (see FIG. 6), to make contact with the conveyer belt 8. The mechanical means can include a locking device (not shown) that releases the wiping device 24 after a predetermined cycle of the conveyor belt 8. The details are not shown, but this cleaning apparatus could be automated, for example, by using an electric and/or hydraulic servo system.

FIG. 6 shows a cross section through the region 5–5' of FIG. 5. FIG. 6 also shows superimposed on the cross section through 5–5' the lever 34 for raising and lowering the wiping device 24 (with flexible sleeve 30) a distance D to apply the wet-wipe disposable towel 27. Although the lever 34 is shown for the second embodiment, to simplify the drawings, the lever is also applicable to the first embodiment which includes the spraying tube 14. Also shown in FIGS. 4 and 6 is an optional roller 32 that supports the conveyor belt during cleaning.

While the invention has been particularly shown and described with reference to the preferred embodiments thereof, it will be understood by those skilled in the art that various changes in form and details may be made without departing from the spirit and scope of the invention.

What is claimed is:

1. A cleaning apparatus for a conveyor belt on a conveyor table comprised of:
   a housing that extends under and across a portion of said conveyor belt normal to said conveyor belt direction of motion to provide a cleaning chamber;
   at least one spraying tube with an array of orifices extending through an opening in a first side of said housing and extending over to a second side and in proximity to said conveyor belt to direct a cleaning solution onto said conveyor belt;
   a wiping device in said housing having at least one disposable towel and extending across and normal to said conveyor belt direction for removal of said cleaning solution and any included contaminants by said disposable towel and said wiping device is a cylinder having an outer flexible sleeve and said disposable towel positioned between said flexible sleeve and said conveyor belt, whereby a static frictional force between said flexible sleeve and said disposable towel is greater than the sliding frictional force between said conveyor belt and said disposable towel when said conveyor belt is in motion.

2. The cleaning apparatus of claim 1, wherein said housing is made from a material selected from the group that includes plastics, metals, and composite materials.

3. The cleaning apparatus of claim 1, wherein said housing is mountable by brackets in said conveyor table using fasteners selected from the group that includes screws, clamps, bolts, and other types of fasteners.

4. The cleaning apparatus of claim 1, wherein said spraying tube is closed at one end, and said tube is composed of material sufficiently rigid to support said cleaning solution under pressure, and said tube extends through a grommet in said first opening and held in place with a mounting nut and said closed end of tube is supported in said second side by a recess in said housing.

5. The cleaning apparatus of claim 1, wherein said cylinder having said outer flexible sleeve is raised by a mechanical, electrical or hydraulic means.

6. The cleaning apparatus of claim 1, wherein said cylinder is coupled to said conveyor belt to rotate at an angular speed to provide a wiping action when said conveyor belt is in motion.

7. The cleaning apparatus of claim 1, wherein the perimeter of said cylinder rotates through a total distance of about the length of said disposable towel when said conveyor belt completes one cycle of rotation on said conveyor table.

8. The cleaning apparatus of claim 1, wherein said spray tube is pressurized selected from a group of means that includes a hand pump, hydraulic device, and an electrical device.

9. The cleaning apparatus of claim 1, wherein said wiping devices is lowered and raised by a means selected from a group that includes manual, hydraulic, and electrical means.

10. A method of cleaning a conveyor belt on a conveyor table comprising the steps of:
   providing a housing that extends under and across a portion of said conveyor belt normal to said conveyor belt direction of motion for a cleaning chamber;
   using at least one spraying tube with an array of orifices extending through an opening in a first side of said housing and extending under to a second side and in proximity to said conveyor belt and directing a cleaning solution onto said conveyor belt;
   using a wiping device in said housing having at least one disposable wiping element and extending across and normal to said conveyor belt direction and removing said cleaning solution and any included contaminants by wiping with said disposable wiping element, wherein said wiping device is a rigid cylinder having an outer flexible sleeve and said rigid cylinder is lowered and raised onto said conveyor belt using a lifting mechanism, and includes said disposable wiping element placed between said flexible sleeve and said conveyor belt.

11. The cleaning method of claim 10, wherein said housing is made from a material selected from the group of materials that includes plastics, metals, and composite materials.

12. The cleaning method of claim 10, wherein said housing is mountable in said conveyor table using brackets and fasteners selected from the group that includes screws, clamps, bolts, and other type fasteners.

13. The cleaning method of claim 10, wherein said spraying tube is closed at one end, and said tube is composed of material sufficiently rigid to support said cleaning solution under pressure, and said tube extends through a grommet in said first opening and is held in place with a mounting nut and said closed end of said tube is supported in said second side by a recess in said housing.

14. The cleaning method of claim 10, wherein, said disposable wiping element between said flexible sleeve and said conveyor belt is selected from the group that includes a disposable paper towel and a wet wipe soaked in an antibacterial solution.

15. The cleaning method of claim 10, wherein said rigid cylinder is coupled to said conveyor belt to rotate at an angular speed to provide a wiping action when said conveyor belt is in motion.

16. The cleaning method of claim 10, wherein said rigid cylinder is coupled to said conveyor belt to rotate through an angle that allows the perimeter of said wiping element to provide a wiping action over the total surface of said wiping element when said conveyor belt completes one cycle of rotation.

17. The cleaning method of claim 10, wherein said wiping element is a disposable towel and the perimeter of said rigid cylinder rotates through a total distance of about the length of said disposable towel when said conveyor belt completes one cycle of rotation on said conveyor table.

18. The cleaning method of claim 10, wherein said spray tube is pressurized using a device selected from a group that includes a manual device, a hydraulic device, and an electrical device.

19. The cleaning method of claim 10, wherein said wiping device that is lowered and raised uses a device selected from a group of devices that includes a manual device, a hydraulic device and an electrical device.

20. A cleaning apparatus for a conveyor belt on a conveyor table comprised of:
   a housing that extends under and across a portion of said conveyor belt normal to said conveyor belt direction of motion to provide a cleaning chamber;
   a wiping device in said housing having at least one disposable wet wipe and extending across and normal to said conveyor belt direction for removal of any contaminants from said conveyor belt, said wiping device is a cylinder having an outer flexible sleeve and said wet wipe is positioned between said flexible sleeve and said conveyor belt, wherein a static frictional force between said flexible sleeve and said wet wipe is greater than the sliding frictional force between said conveyor belt and said wet wipe when said conveyor belt is in motion.

\* \* \* \* \*